A. MASZCZYK.
COUPLING.
APPLICATION FILED DEC. 8, 1921.
1,425,206.
Patented Aug. 8, 1922.
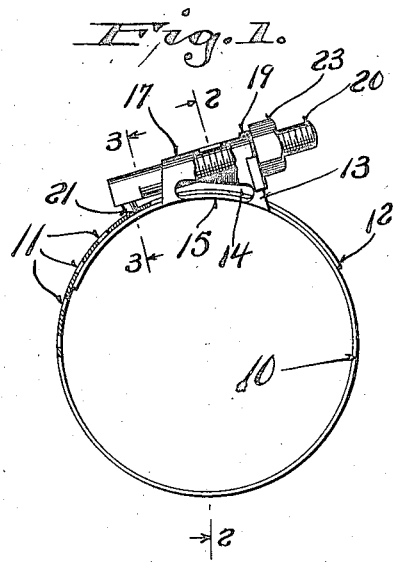
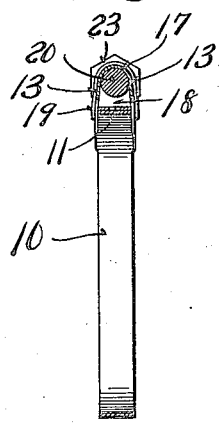
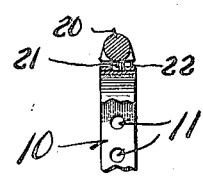
Inventor:
Alexander Maszczyk
Witness:
R. E. Weber
By Young & Young
Attorneys

UNITED STATES PATENT OFFICE.

ALEXANDER MASZCZYK, OF MILWAUKEE, WISCONSIN.

COUPLING.

1,425,206. Specification of Letters Patent. Patented Aug. 8, 1922.

Application filed December 8, 1921. Serial No. 520,782.

*To all whom it may concern:*

Be it known that I, ALEXANDER MASZCZYK, a citizen of the United States, and resident of Milwaukee, in the county of Milwaukee and State of Wisconsin, have invented certain new and useful Improvements in Couplings; and I do hereby declare that the following is a full, clear, and exact description thereof.

The invention is an improvement in a band used to tighten up the end of a flexible hose or like member on a rigid support.

Hitherto with the devices in practice difficulty has been experienced by reason of the lack of complete circumferential flexibility of the band, the limitation on its adjustability, the tendency of the ends to catch or engage frictionally in an objectionable manner with the hose, the inclination of the parts operating during adjustment, to bend and be deformed in an objectionable manner with long usage, and general weakness of constricting action of the band.

The invention comprises a flexible metallic band having a number of spaced apertures therein extending from one end and spaced apart, a support on the other end integral with the band and cut away adjacent the band so as to produce a maximum of flexibility of the band near the cut away portion, a bolt, a detent integral therewith, and adapted to engage with the apertures, and means for moving the detent towards the support. The objects aimed at and attained in the novel construction are, extreme range of adjustability of the band so as to enable it to be used on hoses and the like of varying dimensions, great strength of gripping action, ease of operation of the device, friction being eliminated, and all tendency of the tightening mechanism to catch on the hose section being removed. This absence of catching action results from the operation of the detent engaging in the apertures and drawing up one end of the band on the other, the ends of the band overlapping and permitting free relative movement, the detent not coming in contact with the hose itself. A feature of the device is the strength of the cooperating parts and the simplicity of manufacture.

Other objects and advantages will appear as the description proceeds. Reference is had to the accompanying drawings, in which:—

Figure 1 is a side elevation of the device, and

Figures 2 and 3 are cross sections on the line 2—2 and 3—3 respectively, of Figure 1.

Band 10 is apertured at 11 for a desired distance extending from end 12 and has outwardly directed therefrom flanges 13 cut away at 14 so as to provide a maximum of flexibility at 15 in order to produce the most satisfactory gripping action. Flanges 13 are bowed toward each other as shown at 17 and provided with a ferrule having an apertured flat portion 18 from which a flange 19 is directed in a suitable manner to embrace flanges 13. A bolt 20 moves freely through the aperture of flat portion 18 and has a detent 21 downwardly directed from its end. The end of bolt 20 is provided with a flat surface 22 for contacting with band 10 in certain positions and facilitating the insertion of detent 21 in apertures 11. Nut 23 is threaded on bolt 20 which is threaded throughout the greater part of its length. It is apparent that when the parts are in the relation shown in Figure 1 the tightening of nut 23 operates to move detent engaged in an aperture 11 and thus contracts the band.

Obviously the relation of parts and the shape of flanges 13 are such as to make a structure of the greatest strength. The detent 21 is not limited in its constricting movement by the adjacent end of flange 13 as shown in Figure 1 but is capable of traveling till it is near flat portion 18. This gives a very great range of adjustability. I do not limit myself to the exact embodiment illustrated as many variations might be introduced therein by one skilled in the art, but contemplate a substantial range of equivalence within the scope of the following claim.

I claim as my invention:—

The combination of an annular band having spaced apertures and overlapped ends, a support adjacent one end and rigid therewith, a bolt, a nut threaded thereon and engaging in tightening position with said support, and a detent on said bolt for engaging in said apertures and contracting said band.

In testimony that I claim the foregoing I have hereunto set my hand at Milwaukee in the county of Milwaukee and State of Wisconsin.

ALEXANDER MASZCZYK.